United States Patent

Harder

[15] 3,700,077
[45] Oct. 24, 1972

[54] CHOCK FOR A TANDEM WHEELED TRAILER

[72] Inventor: Abraham Harder, 6230 Lewis Avenue, Long Beach, Calif. 90805

[22] Filed: July 13, 1971

[21] Appl. No.: 162,154

[52] U.S. Cl. .................................................. 188/32
[51] Int. Cl. ............................................... B60t 3/00
[58] Field of Search ..................... 188/2 R, 4, 32, 36

[56] References Cited

UNITED STATES PATENTS

| | | |
|---|---|---|
| 3,318,419 | 5/1967 | Chastain.......................188/32 |
| 3,338,338 | 8/1967 | Lindeen........................188/32 |
| 3,547,228 | 12/1970 | Wiley...........................188/32 |

*Primary Examiner*—Duane A. Reger
*Attorney*—Harold A. Dreckman

[57] ABSTRACT

This invention relates to a means of holding the wheels of a trailer or the like against accidental rolling or movement. The spaced hollow tubes engage aligned wheels of the trailer and are pressed tightly against these wheels by means of an off-center coupling which is extended by pressing downwardly against the hinged portion of the coupling.

4 Claims, 4 Drawing Figures

PATENTED OCT 24 1972 3,700,077

INVENTOR.
ABRAHAM HARDER
BY
ATTORNEY

CHOCK FOR A TANDEM WHEELED TRAILER

An object of my invention is to provide a novel chock in which the spaced tubular members are pressed apart by a hinged coupling member, which can be extended to a limited extent by stepping down upon the center or hinged portion of the coupling member.

Another object of my invention is to provide a novel chock for tandem wheels which is simple in construction, inexpensive to manufacture, and which can be extended through a limited range by stepping on the center of the coupling member, and without the user having to stoop excessively or kneel in the dirt.

Still another object is to provide a novel means of longitudinally adjusting the coupling member as might be required to fit the particular set of tandem wheels.

Other objects, advantages and features of invention may appear from the accompanying drawing, the subjoined detailed description and the appended claims.

Figure 3:
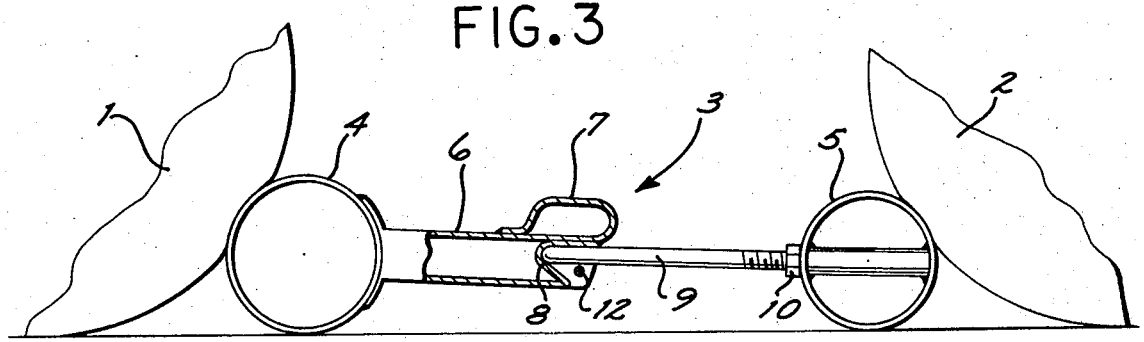
FIG. 3 is a view similar to FIG. 2 but showing the parts in extended position.
Figure 4:
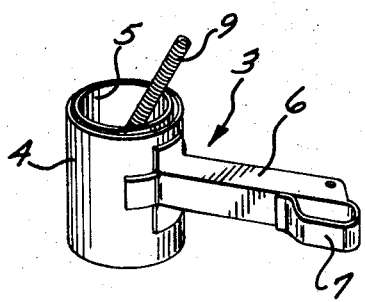
FIG. 4 is a perspective view of my chock in disassembled position.

Referring more particularly to the drawing, the tandem wheels of the trailer or the like are indicated at 1 and 2. These wheels are spaced in longitudinal alignment and are employed on many types of trailers or trucks. My chock construction 3 is placed on the ground between the wheels 1 and 2 and consists of a pair of spaced tubes or hollow cylinders 4 and 5. These tubes are made of metal and are held in position to engage the wheels 1 and 2 by the following construction: An arm 6 is fixedly attached to the outside of the tube 4, preferably by welding the parts together or the like, and this arm extends substantially horizontal when in position to engage the wheels 1 and 2. A hand hold or loop 7 is fixedly attached to the outer end of the arm 6, and this loop is of sufficient size so that it can be stepped upon by the user when the parts are extended to engage the wheels 1 and 2 when in chocking position. The outer end of the arm 6 is bent inwardly, as shown at 8, to act as a rest or seat for the bar 9. This bar 9 is threaded into the tube 5 and is held in the desired adjusted position by the nut 10. The outer end of the bar rests in the seat 8 and thus will hold the tubes 4-5 in spreaded position, as shown in FIG. 3.

Figure 1:
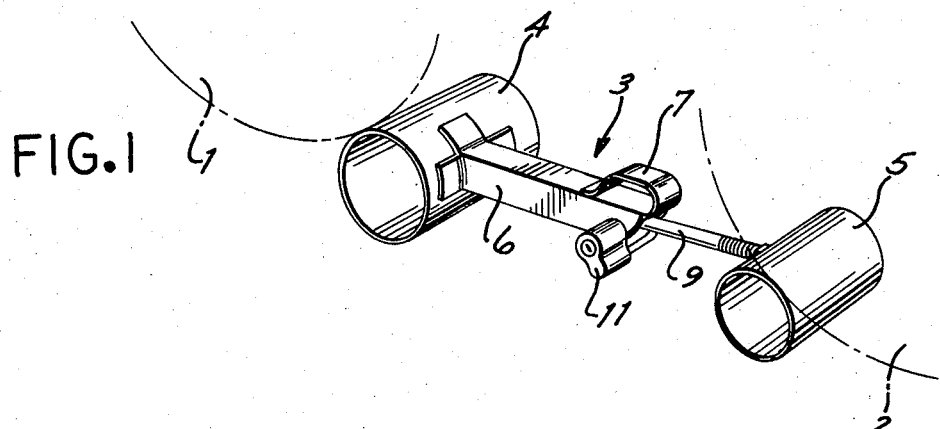
FIG. 1 is a perspective view of my chock in operative position.
Figure 2:
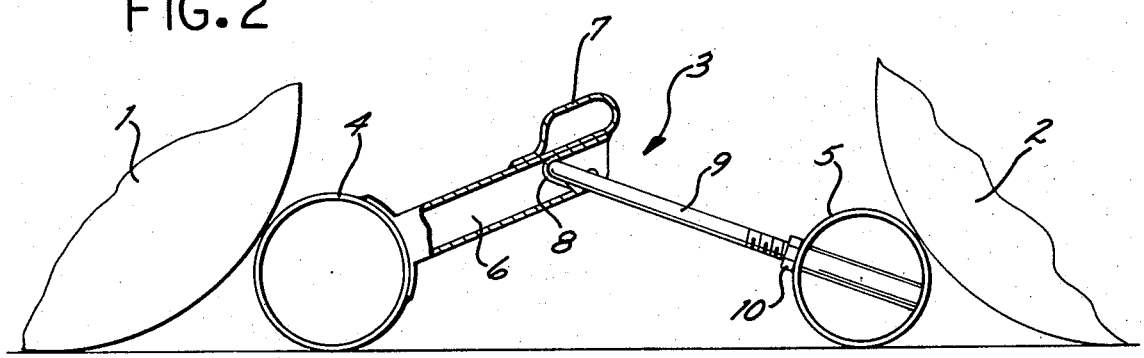
FIG. 2 is a side elevation of my chock in position between the tandem wheels.

If desired, the parts may be locked when in spread position by means of the lock 11, the hasp of which is passed through the holes 12, as shown in FIG. 1.

Having described my invention, I claim:

1. A chock assembly for placing between two tandem wheels to hold the wheels from rolling, comprising two cylindrical chocks for positioning between tandem wheels with their longitudinal axis parallel, said chocks when so positioned having their side surfaces in line contact with the ground with at least a portion of the side surface of each chock making substantially line contact with one wheel, and means extending between the chocks to move the chocks apart into line contact with the wheels, said means comprising an arm fixedly secured to one of said chocks, a seat on the outer end of said arm, a bar mounted on the other of said chocks, the outer end of said bar being seated in said seat.

2. A chock assembly as recited in claim 1, and said bar being threaded into the other said chock to adjust said bar relative to said seat.

3. A chock assembly as recited in claim 1, and a loop on the outer end of said arm, said loop providing a hand hold to actuate the arm and bar.

4. A chock assembly as recited in claim 1, said bar being threaded into the other said chock to adjust said bar relative to said seat, and a loop on the outer end of said arm, said loop providing a hand hold to actuate the arm and bar.

* * * * *